United States Patent
Padron

(10) Patent No.: US 10,749,241 B2
(45) Date of Patent: Aug. 18, 2020

(54) THROUGH-LID COMMUNICATION RADIO FOR A WATER METER AND WATER METER ASSEMBLY

(71) Applicant: DIEHL METERING GMBH, Ansbach (DE)

(72) Inventor: Danny Padron, Frisco, TX (US)

(73) Assignee: Diehl Metering GmbH, Ansbach (DE)

( * ) Notice: Subject to any disclaimer, the term of this patent is extended or adjusted under 35 U.S.C. 154(b) by 178 days.

(21) Appl. No.: 15/902,334

(22) Filed: Feb. 22, 2018

(65) Prior Publication Data

US 2019/0260106 A1   Aug. 22, 2019

(51) Int. Cl.
| | |
|---|---|
| *G01D 4/02* | (2006.01) |
| *H01Q 1/12* | (2006.01) |
| *G01D 4/00* | (2006.01) |
| *H04Q 9/00* | (2006.01) |
| *H01Q 1/22* | (2006.01) |

(52) U.S. Cl.
CPC ........... *H01Q 1/1207* (2013.01); *G01D 4/002* (2013.01); *H01Q 1/225* (2013.01); *H04Q 9/00* (2013.01); *H04Q 2201/10* (2013.01); *H04Q 2209/40* (2013.01); *H04Q 2209/60* (2013.01); *H04Q 2209/84* (2013.01)

(58) Field of Classification Search
CPC ...... H01Q 1/1207; H01Q 1/225; G01D 4/002; H04Q 9/00
See application file for complete search history.

(56) References Cited

U.S. PATENT DOCUMENTS

| | | | |
|---|---|---|---|
| 6,072,405 A | | 6/2000 | Sears |
| 6,414,605 B1 * | | 7/2002 | Walden .................. G01D 4/008 340/870.02 |
| 6,617,976 B2 | | 9/2003 | Walden et al. |
| 6,954,144 B1 * | | 10/2005 | Kiser ...................... G01D 4/002 340/10.1 |
| 10,276,939 B1 * | | 4/2019 | Webb ................... H01Q 9/0421 |
| 2016/0011020 A1 * | | 1/2016 | Ehrenpfordt ......... G01D 11/245 73/431 |

FOREIGN PATENT DOCUMENTS

| | | | |
|---|---|---|---|
| CN | 206321298 U | * | 7/2017 |
| CN | 206362399 U | * | 7/2017 |

OTHER PUBLICATIONS

Godwin, Angela, Advanced Metering Infrastructure: Drivers and Benefits in the water industry, Jan. 18, 2018;
Diehl Metering, Izar@Mobile 2, Jan. 18, 2018.

\* cited by examiner

*Primary Examiner* — Jamel E Williams
(74) *Attorney, Agent, or Firm* — Laurence A. Greenberg; Werner H. Stemer; Ralph E. Locher

(57) ABSTRACT

A communication radio for a water meter includes an antenna housing, a bracket integrally connected to the antenna housing, and an electronics housing pivotably connected to the bracket. A water meter assembly includes a water meter box having a lid with an inner surface, an outer surface and a hole formed in the lid, a water meter disposed in the water meter box, and a communication radio. The communication radio includes an antenna housing disposed on the outer surface of the lid, a bracket disposed on the inner surface of the lid and fixedly connected to the antenna housing through the hole, and an electronics housing connected to the bracket inside the water meter box in a pivotable manner for preventing contact between the electronics housing and the water meter.

8 Claims, 3 Drawing Sheets

US 10,749,241 B2

THROUGH-LID COMMUNICATION RADIO FOR A WATER METER AND WATER METER ASSEMBLY

BACKGROUND OF THE INVENTION

Field of the Invention

The invention relates to a communication radio to be installed through a hole in a lid of a water meter box according to the Advanced Metering Infrastructure (AMI) technology. The invention also relates to a water meter assembly including the communication radio and a water meter in a water meter box.

Description of the Related Art

In the past, water meters were read by a person walking up to and reading the water meter. According to the Advanced Meter Reading (AMR) technology, a device which automatically pings the meter is used so that the meter can be read by walking up to the meter, by driving by the meter or by using a fixed network. AMR technology therefore carries out the reading in one direction, from the meter to the reading device. In contrast, Advanced Metering Infrastructure (AMI) technology carries out communication in two directions, between the water meter and a utility system over a fixed network. AMI technology allows continuous monitoring of the entire distribution network to identify leaks, especially when they are small, in order to save water and save money by allowing the leaks to be detected when they are small. IZAR NET is a type of AMI technology which allows precise guidance during a reading tour.

Water meters are generally located in a box which is buried in the ground so that only the lid of the box is at the level of the surface of the ground. A water supply pipe extends through the sides of the box and both the water meter and a valve are connected to the pipe within the box. An AMI communication radio is installed through a hole in the lid of the box and secured by a locking nut.

Conventional AMI communication radios mounted through the lid of the box are known from U.S. Pat. Nos. 6,617,976 and 6,072,405. The electronics in the prior art devices are disposed within a cylindrical tube with a beveled top. Some devices are formed in one piece and others have a plastic housing formed in two pieces which are screwed together and may have plastic adapter parts to secure the device to the lid. In such mountings, the lid of the box may interfere with the propagation of the RF signal and the radio may make contact with the water meter, the piping or the soil, which also degrades the signal and may damage the radio.

BRIEF SUMMARY OF THE INVENTION

It is accordingly an object of the invention to provide a through-lid communication radio for a water meter and a water meter assembly, which overcome the hereinafore-mentioned disadvantages of the heretofore-known radios and assemblies of this general type and which avoid interference with an RF signal due to mounting on a lid or contact with a water meter, piping or soil.

With the foregoing and other objects in view there is provided, in accordance with the invention, a communication radio for a water meter. The communication radio comprises an antenna housing, a bracket integrally connected to the antenna housing, and an electronics housing pivotably connected to the bracket.

The radio of the invention therefore is formed in two parts, in which one part is the antenna housing fixed to the bracket and other part is the electronics housing. The two-part structure of the radio makes it easy to install with the two parts connected to each other. The antenna housing and the bracket may be fixedly connected to each other or formed as one piece.

The ability to move the electronics housing closer to the lid because of the pivotable connection, allows less space to be used within the box, unlike prior art devices which protrude more deeply into the box and usually make contact with the water meter, water piping or the soil within the box.

In accordance with another feature of the invention, the bracket has a width being smaller than a diameter of a hole in a lid of a water meter box, the antenna housing has a width being greater than the diameter of the hole in the lid of the water meter box. A fastener is configured to fasten the communication radio to the lid of the water meter box with the bracket below the lid and the antenna housing above the lid. The fastener is a lock nut to be screwed on a screw thread on the bracket or a ratchet having spring-loaded pins protruding from the bracket. The lid is therefore sandwiched between the antenna housing and the fastener, simultaneously sealing the hole in the lid.

In accordance with a further feature of the invention, the bracket has a U-shape with two legs for receiving the electronics housing therebetween. Each of the legs has a respective opening formed therein. A screw is configured to pass through the openings in the legs and a hole in the electronics housing, permitting the pivotable connection of the electronics housing to the bracket, and a nut is configured to tighten the screw. The openings in the legs may be slots permitting an adjustment of an extent to which the electronics housing protrudes from the bracket. The electronics housing can therefore be positioned at an angle relative to the bracket and moved close to the lower surface of the lid.

In accordance with yet an added feature of the invention, the antenna housing is dome-shaped and contains an antenna. The location of the antenna within the antenna housing, which is the top part, allows for maximum unobstructed radio transmission. The height of the dome is limited to ¼ inch (6.4 mm) which eliminates any trip hazard caused by the antenna housing protruding above the lid, according to the Americans With Disabilities Act (ADA).

In accordance with an additional feature of the invention, the bracket has a base, and the base and the electronics housing have cylindrical cross sections being smaller than the diameter of the hole in the lid of the water meter box. The hole in the lid will be approximately between 1¾ and 2 inches (44.45-50.8 mm) in diameter.

In accordance with yet another feature of the invention, the electronics housing contains a battery and electronics being connected to a printed circuit board (PCB) and potted. A coaxial cable is connected between the antenna housing and the electronics housing. The coaxial cable is located between the legs of the bracket, thus eliminating any possibility of pinching the cable when the radio is installed in the lid.

With the objects of the invention in view, there is concomitantly provided a water meter assembly, comprising a water meter box having a lid with an inner surface, an outer surface and a hole formed in the lid, a water meter disposed in the water meter box, and a communication radio. The communication radio includes an antenna housing disposed above the outer surface of the lid, a bracket disposed below the inner surface of the lid and integrally connected to the antenna housing through the hole, and an electronics housing connected to the bracket inside the water meter box in a pivotable manner for preventing contact between the electronics housing and the water meter. The assembly has the same advantages as the communication radio discussed above.

Other features which are considered as characteristic for the invention are set forth in the appended claims.

Although the invention is illustrated and described herein as embodied in a through-lid communication radio for a water meter and a water meter assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of the specific embodiment when read in connection with the accompanying drawings.

DETAILED DESCRIPTION OF THE INVENTION

Figure 1:
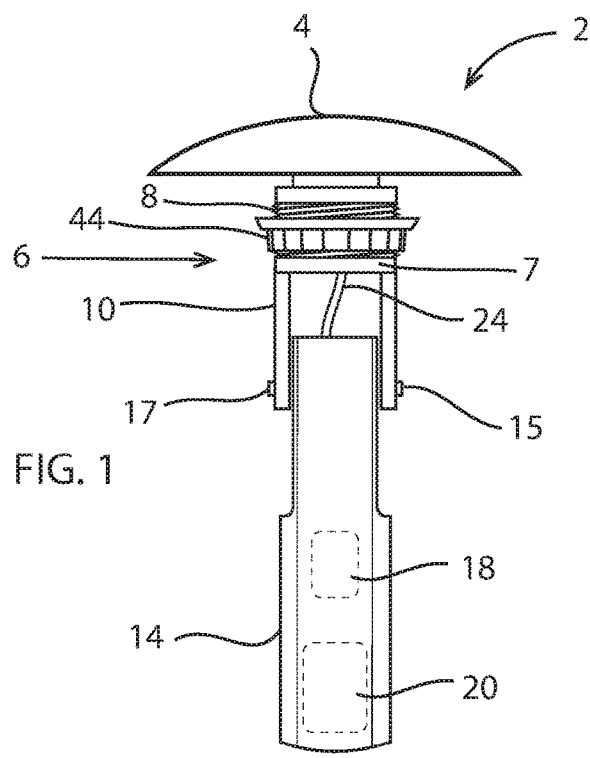
FIG. 1 is a diagrammatic, side-elevational view of a through-lid communication radio for a water meter according to the present invention.
Figure 2:
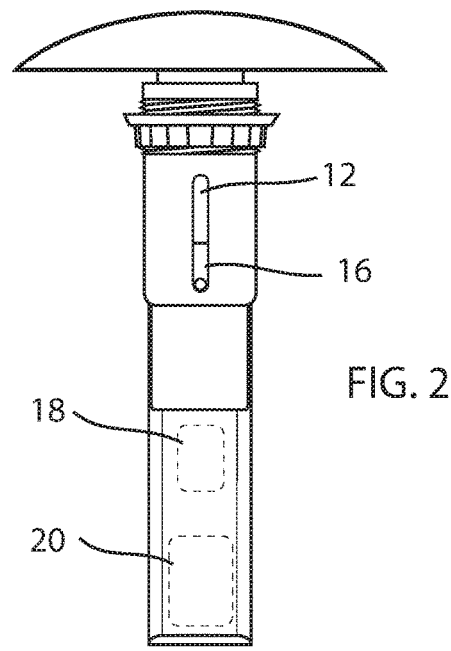
FIG. 2 is a front-elevational view of the communication radio.
Figure 3:
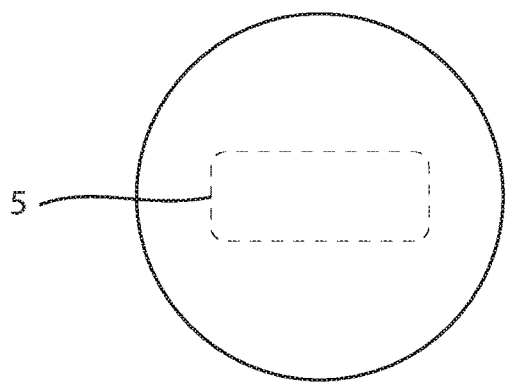
FIGS. 3 and 4 are respective top-plan and bottom-plan views of the communication radio.
Figure 4:
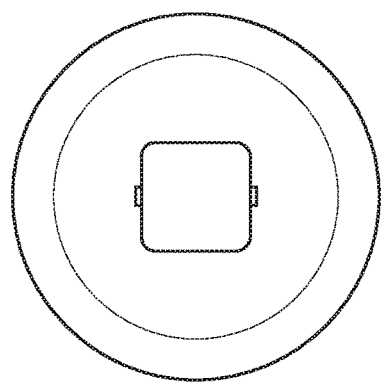

Referring now to the figures of the drawing in detail and first, particularly, to FIGS. 1 and 2 thereof, there is seen a communication radio 2 to be installed in the lid of a water meter box. The side-elevational view of FIG. 1 and the front-elevational view of FIG. 2 show that the radio includes a mushroom-shaped antenna housing 4 having a domed-shaped top to be located above the lid of the water meter box. The antenna housing 4 contains an antenna 5. A U-shaped bracket 6 is integrally connected to the bottom of the antenna housing 4. In other words, the antenna housing and the bracket may be formed as one piece or two pieces fixedly connected to one another. A screw thread 8 is located on a base 7 of the bracket 6, just below the bottom of the antenna housing 4. Two legs 10 of the U-shaped bracket 6 are spaced apart for receiving an electronics housing 14. The legs 10 each have an opening 12 formed therein. A screw 16 passes through a hole in the electronics housing 14 and the openings 12 in the bracket 6. The screw 16 has a head 17 and a nut 44 (shown in FIG. 9) for tightening the screw 16. The openings 12 may be holes or slots which allow an adjustment of the extent to which the electronics housing 14 protrudes from the bracket 6. The electronics housing 14 contains a battery 18 and electronics 20 being connected to a PCB and potted. FIG. 3 shows that the antenna 5 is disposed within the antenna housing 4 and FIG. 4 shows the communication radio 2 from the bottom. A coaxial cable 24 extends from the antenna 5 to the electronics 20.

Figure 5:
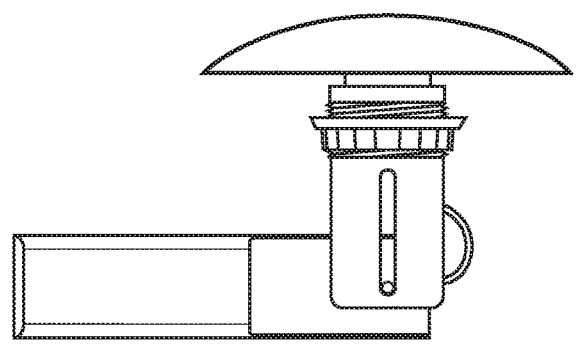
FIG. 5 is a view similar to FIG. 2 showing the communication radio in a folded or pivoted position.

The screw 16 permits the electronics housing 14 to be pivoted to a desired position after mounting in a hole in the lid of the water meter box to avoid contact with the water meter, piping or soil. The pivoted or folded position of the communication radio 2 is shown in FIG. 5.

Figure 6:
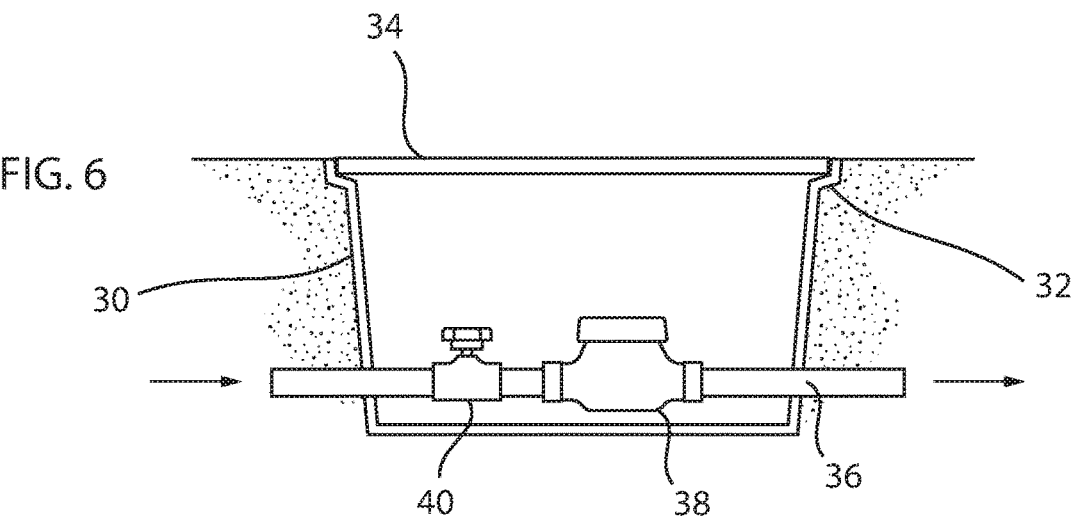
FIGS. 6, 7 and 8 are vertical-sectional views showing stages in the installation of the communication radio within a water meter box having a water meter, a valve and piping.
Figure 7:
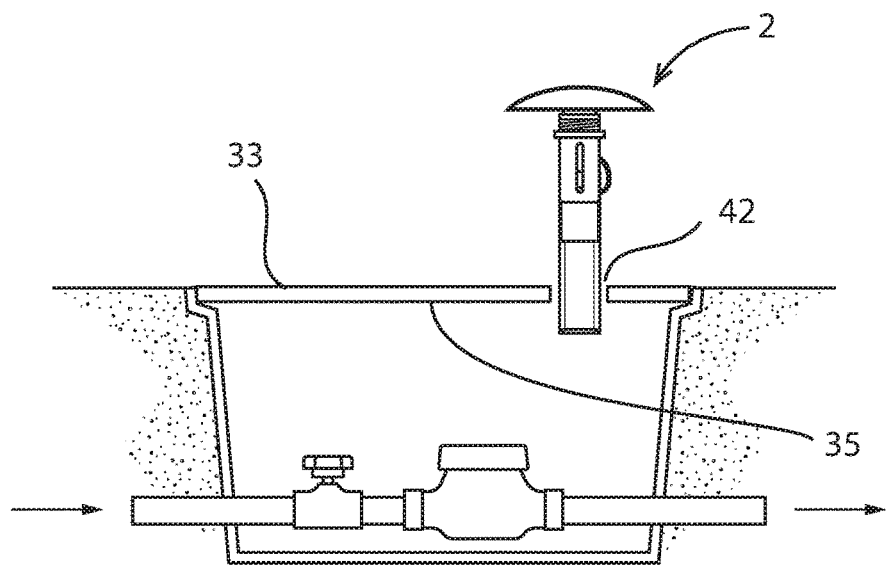
Figure 8:
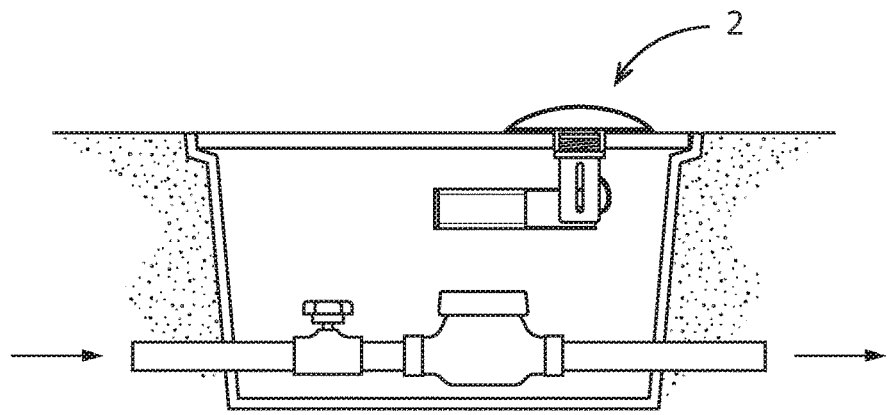

FIGS. 6, 7 and 8 show stages in the installation of the communication radio 2. It may be seen from FIG. 6 that a water meter box 30, which is usually formed of plastic, has flanges 32 for accepting a lid 34 which may be dropped into place or hinged so as to lie at the surface of the ground. Piping 36, a water meter 38 and a valve 40 are disposed within the box 30.

It is seen from FIG. 7 that a hole 42 has been drilled in the lid 34 and the radio 2 is located partly above the hole 42 with the electronics housing 14 in a vertical orientation in alignment with the bracket 6. The hole 42 extends between an inner surface 35 and an outer surface 33 of the lid 34.

As is seen in FIG. 8, the radio 2 has been locked to the lid 34 and the electronics housing 14 has been pivoted at an approximately 90° angle. This is accomplished by removing or rotating the lid on its hinges, inserting the electronics housing 14 and the bracket 6 though the hole 42 from the outside with the antenna housing remaining above the lid, locking the bracket 6 to the lid 34, pivoting the electronics housing 14 to the desired degree to avoid contact with any equipment or soil, tightening the nut 44 (shown in FIG. 9) on the screw 16 and closing the box 30 with the lid 34.

Figure 9:
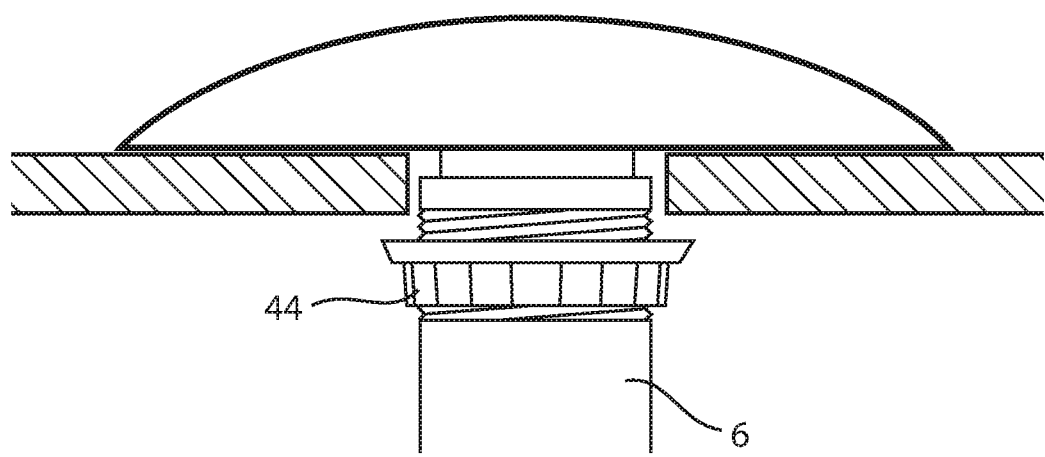
FIG. 9 is an enlarged, fragmentary, vertical-sectional view of a screw lock fastening the communication radio to the lid of the water meter box.
Figure 10:
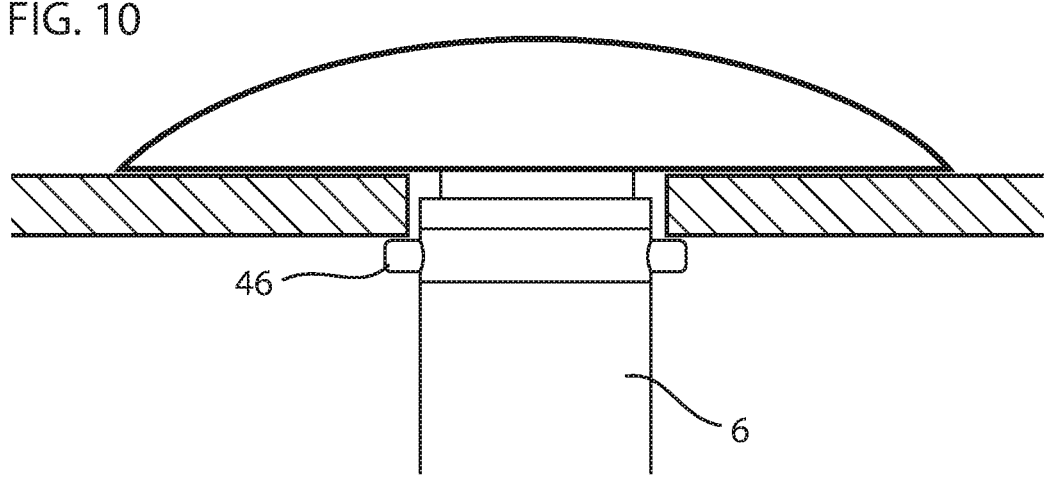
FIG. 10 is a view similar to FIG. 7 showing a ratchet lock fastening the communication radio to the lid of the water meter box.

FIG. 9 shows that a fastener in the form of the locking nut 44 on the screw thread 8 is being used to lock the bracket 6 to the lid 34. In an alternative construction shown in FIG. 10, a fastener in the form of a ratchet lock is provided with spring-loaded pins 46 which lock the bracket 6 to the lid 34. The pins are manually depressed against the force of springs within the bracket 6 for installing and removing the radio 2. After installation, the radio is connected to the water meter.

The invention claimed is:

1. A communication radio for a water meter, the communication radio comprising:
   an antenna housing;
   a bracket integrally connected to said antenna housing;
   said bracket having a width being smaller than a diameter of a hole in a lid of a water meter box and said antenna housing having a width being greater than the diameter of the hole in the lid of the water meter box;
   an electronics housing pivotably connected to said bracket; and
   a fastener configured to fasten the communication radio to the lid of the water meter box with said bracket below the lid and said antenna housing above the lid, said fastener being a ratchet having spring-loaded pins protruding from said bracket.

2. A communication radio for a water meter, the communication radio comprising:
   an antenna housing;
   a bracket integrally connected to said antenna housing,
   an electronics housing pivotably connected to said bracket;
   said bracket having a U-shape with two legs for receiving said electronics housing therebetween;

each of said legs having a respective opening formed therein;

a screw configured to pass through said openings in said legs and a hole in said electronics housing, permitting said pivotable connection of said electronics housing to said bracket; and a nut configured to tighten said screw.

3. The communication radio according to claim 2, wherein said openings in said legs are slots permitting an adjustment of an extent to which said electronics housing protrudes from said bracket.

4. The communication radio according to claim 2, wherein said antenna housing is dome-shaped and contains an antenna.

5. The communication radio according to claim 2, wherein said electronics housing contains a battery and electronics being connected to a PCB and potted.

6. The communication radio according to claim 2, wherein said antenna housing and said bracket are formed in one piece.

7. The communication radio according to claim 2, which further comprises a coaxial cable interconnecting said antenna housing and said electronics housing and being disposed between said legs of said bracket.

8. A water meter assembly, comprising:
a water meter box having a lid with an inner surface, an outer surface and a hole formed in said lid;
a water meter disposed in said water meter box; and
a communication radio including:
an antenna housing disposed above said outer surface of said lid,
a bracket disposed below said inner surface of said lid and integrally connected to said antenna housing through said hole,
an electronics housing connected to said bracket inside said water meter box in a pivotable manner for preventing contact between said electronics housing and said water meter;
said bracket having a U-shape with two legs for receiving said electronics housing therebetween;
each of said legs having a respective opening formed therein;
a screw configured to pass through said openings in said legs and a hole in said electronics housing, permitting said pivotable connection of said electronics housing to said bracket; and
a nut configured to tighten said screw.

\* \* \* \* \*